May 1, 1928.
W. M. CROSS
1,667,883
PROCESS FOR TREATING HYDROCARBON OILS
Original Filed July 20, 1922
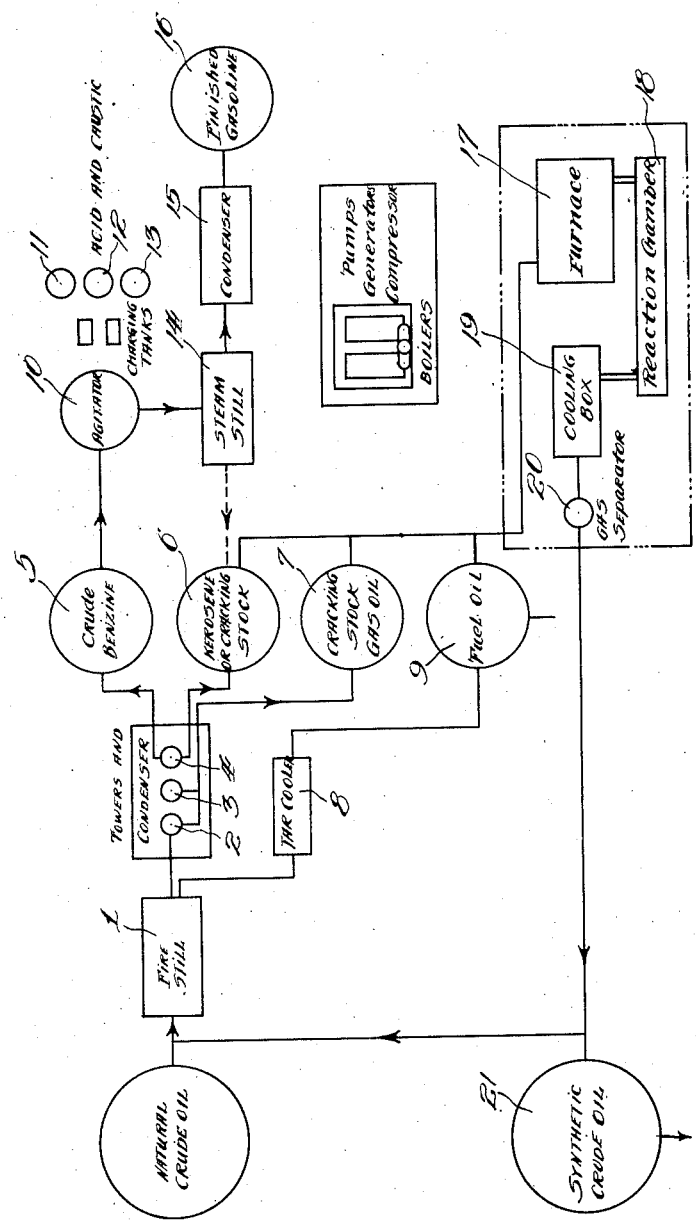
Witness:
Inventor:
Walter Cross.
by Frank L. Belknap, Atty.

Patented May 1, 1928.

1,667,883

UNITED STATES PATENT OFFICE.

WALTER M. CROSS, OF KANSAS CITY, MISSOURI, ASSIGNOR TO THE GASOLINE PRODUCTS COMPANY, OF NEW YORK, N. Y., A CORPORATION OF NEW YORK.

PROCESS FOR TREATING HYDROCARBON OIL.

Application filed July 20, 1922, Serial No. 576,198. Renewed March 5, 1928.

This invention relates to a process for treating petroleum oils and refers more particularly to the treatment of oils in successive stages from their crude state through to the refined gasoline, the products being passed through the successive stages of conversion and refinement, certain products being recycled and others drawn off from the system.

Among the salient objects of the invention are to provide a process in which the natural crude is first subjected to fractional distillation, the lighter products being immediately refined and redistilled to finished gasoline, while the higher boiling point or more refractory cuts such as kerosene bottoms and gas oil cuts are passed to a cracking stage where they are further converted to extract the low boiling point hydrocarbons; to provide a process in which the heavier residual substances withdrawn from the primary distillation stage are separated out and collected as fuel oil; to provide a process in which the hydrocarbon product withdrawn from the cracking stage in the form of a synthetic crude containing a substantial percent of low boiling point hydrocarbon is either withdrawn and redistilled to extract the desired gasoline-like distillates, or is re-run in the fire still with the natural crude.

The single figure is a flow sheet showing the progress of the products through the different stages of the process.

Referring to the figure, the natural crude oil is first charged to the fire still as shown at 1 where it is vaporized, the vapors passing through the reflux condensing towers 2, 3 and 4 where they are subjected to a reflux condensing action.

The lighter products passing over the final tower are condensed and collected as crude benzine, naphtha and like fractions in the tank 5. The reflux condensate separated out in the tower 4 consisting of kerosene bottoms and the like are collected in the tank 6 while the condensate withdrawn from the towers 2 and 3 consists principally of a condensate having the characteristics of a gas oil and the like, and is collected in the tank 7. The residual substances which remain unvaporized in the fire still pass through a tar cooler 8 and are collected in the fuel oil tank 9.

The lighter products consisting of the naphtha, benzine and gasoline-like distillates are withdrawn from the tank 5 and charged to an agitating tank 10 where they are subjected to the refining action of sulphuric acid, caustic potash, and a sweetener such as sodium plumbate, withdrawn from the tanks 11, 12 and 13 and charged to the agitator where they are mixed with the distillate by agitating with air or in any other desired manner. The refined distillates are then passed to steam still 14 where they are vaporized and condensed at 15 to form refined gasoline which is collected in the tank 16. The unvaporized products from the steam still are returned to the tank 6 where they are combined with the kerosene bottoms. From the tanks 6 and 7 is withdrawn cracking stock which is charged to the furnace 17 of the cracking unit. If desired, quantities of fuel oil may be combined with this cracking stock, but as a general rule this oil is so heavily carbon laden and of such a character that it is objectionable as an ingredient in the charging stock.

The charging stock to the cracking still is subjected to conversion temperatures in the furnace 17 ranging from 600° to 1000° F., and pressures in excess of 500 pounds. From the furnace or heating stage the oil is passed to reacting chamber 18 which is insulated to maintain a conversion temperature upon the oil and pressures are maintained sufficient to retain the oil substantially in the liquid phase. The oil which passes through the coils of the furnace although heated to a conversion temperature, has had insufficient time in its travel therethrough to effect the desired conversion and in being passed to the enlarged reacting chamber where it is slowly permitted to collect in a relatively large body, the oil has sufficient time in its passage for an equilibrium to be reached between the vapor phase and the liquid phase.

The discharge from the reacting chamber is set at a liquid level and controls this level in the reacting chamber without any other automatic device than the ordinary relief valve. The oil from the reacting chamber is passed through the cooling coil 19 under reduced pressure and through the gas separator 20 from which the gas is withdrawn and the oil is discharged to the synthetic crude storage tank 21. This synthetic crude requires no more treatment than the pressure distillate made in pressure distillation systems of cracking. The oil may be passed back and recharged with the natural crude oil to the fire still, or it may be drawn off from the synthetic crude oil tank 21 and treated separately. From this synthetic crude may be extracted from 30% to 40% of Navy gasoline.

The amount of fuel oil combined with the charging stock to the cracking unit will depend upon the character of the oil treated, and other factors which may be ascertained by the operation.

In many cases it is not advisable to rerun any of the fuel oil withdrawn from any of the original distillation charges as it has a high carbon content.

I claim as my invention:

1. A process for treating hydrocarbon oil consisting in fractionally distilling the oil, condensing and separately collecting the respective fractions, withdrawing the tarry residual products, subjecting the gasoline-like fractions to a refining action and redistillation to produce refined gasoline, directing the more refractory fractions and selected portions of the residual material to a cracking stage and there subjecting said fractions and residual material to a conversion temperature and pressures in excess of 500 pounds whereby the conversion is effected substantially in the liquid phase, drawing off the synthetic product containing a substantial percentage of low boiling oils and cooling it, returning said product to be recycled through the fractional distillation stage and diverting a portion of the heavy residual oils from the system.

2. A process for treating hydrocarbon oil consisting in fractionally distilling the oil, condensing and separately collecting the respective fractions, withdrawing and collecting the residual products from the initial distilling stage, subjecting the lighter fractions to successive refining operations and a redistilling action, directing the higher boiling point cuts combined with predetermined portions of the residual material to a cracking stage and there producing conversion of the oil to form a synthetic crude containing an increased percentage of low boiling point hydrocarbons by heating the oil to a conversion temperature and maintaining sufficient pressure to cause the digestion and stabilization of the molecules of the converted product while it is maintained substantially in the liquid phase, drawing off and cooling the liquid synthetic product and recycling it to the primary distillation stage to extract the lighter fractions therefrom.

WALTER M. CROSS.